United States Patent [19]

Harrington et al.

[11] Patent Number: 4,585,082

[45] Date of Patent: Apr. 29, 1986

[54] WEIGHT SCALE UTILIZING A CAPACITATIVE LOAD CELL

[76] Inventors: Richard H. Harrington, 631 Third St., Ann Arbor, Mich. 48103; Charles W. Krapf, 3642 Partridge Path, Ann Arbor, Mich. 48104

[21] Appl. No.: 642,123

[22] Filed: Aug. 17, 1984

[51] Int. Cl.[4] .................. G01G 3/14; H01G 5/01; H01G 7/00; H01G 5/16
[52] U.S. Cl. .................. 177/210 C; 361/278; 361/283; 361/290
[58] Field of Search .................. 177/210 C; 361/278, 361/283, 290

[56] References Cited

U.S. PATENT DOCUMENTS

| | | | |
|---|---|---|---|
| 1,871,048 | 8/1932 | Dubilier | 361/278 X |
| 2,721,976 | 10/1955 | Wojciechowski | 361/278 X |
| 3,966,002 | 6/1976 | Schneider | 177/210 C X |
| 4,372,405 | 2/1983 | Stuart | 177/210 C X |
| 4,381,040 | 4/1983 | Brouwer | 177/210 C |

Primary Examiner—George H. Miller, Jr.
Attorney, Agent, or Firm—James M. Deimen

[57] ABSTRACT

A platform weight scale comprising a capacitative load cell sensing means configured to be insensitive to off center loading of the horizontal platform regardless of load amount or location on the platform. The platform is supported by a plurality of springs selected for equal spring rates. The load cell is electrically connected into a FET (Field Effect Transistor), CMOS (Complementary Metal Oxide Semiconductor) or Bi-Polar semiconductor multivibrator circuit selected and designed to sense electric currents on the order of $10^{-13}$ amperes. In one preferred embodiment the load cell comprises a grounded hemispherical surface opposing a flat charged plate. In alternate embodiments the load cell comprises a differential capacitor or a parallel plate capacitor suspended in a manner that is insensitive to off center loading. The differential capacitor load cell embodiment utilizes an alternating switch circuit as a part of the multivibrator circuit. As a third alternative, a frequency modulated system clock circuit that is modulated by the load cell capacitance or differential capacitance may be utilized as the weight sensing circuit and driver for peripheral attachments to the scale circuit.

26 Claims, 15 Drawing Figures

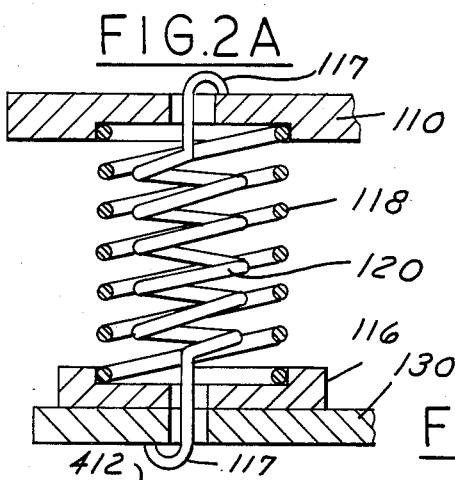
FIG.2A
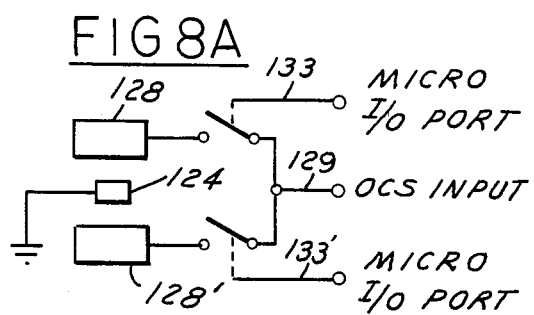
FIG 8A
FIG.11

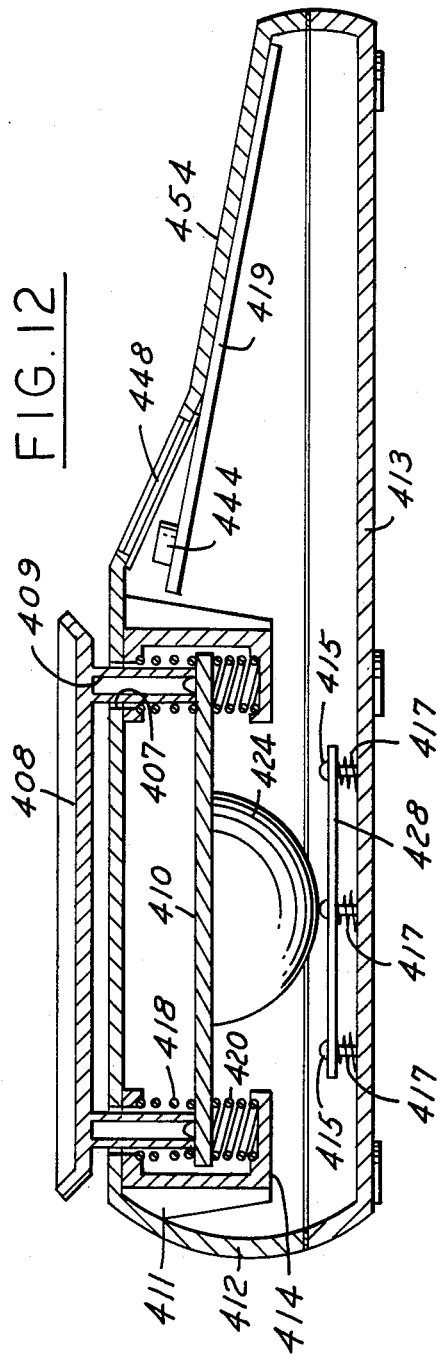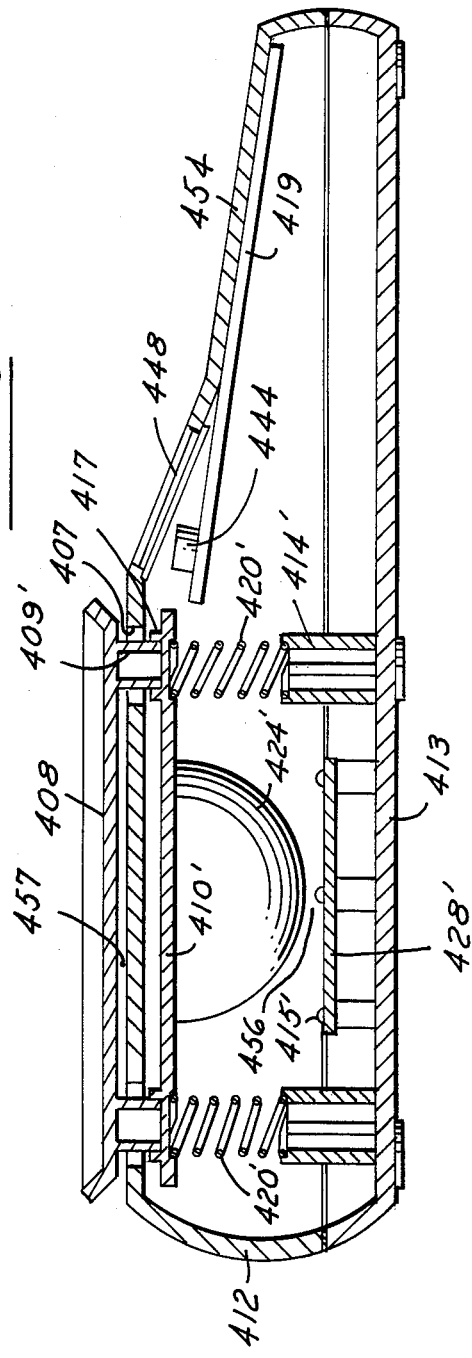

WEIGHT SCALE UTILIZING A CAPACITATIVE LOAD CELL

BACKGROUND OF THE INVENTION

The field of the invention pertains to weight scales and, in particular, to electro-mechanical scales for weighing individual servings of food, however, the features of the scale are applicable to weighing ranges considerably greater or less than a range from fractions of an ounce to about a pound.

Typically, mechanical weighing means have utilized multiple lever arrangements and spring arrangements to move a dial indicator or balancing weight arm in response to the weight. More recently electric sensing means have been added for greater sensitivity and remote reading of the weight placed on the scale. The advent of miniaturized and sophisticated electronic circuitry in the form of integrated circuits at very low cost now permits sophisticated computations to be almost instantaneously performed in response to the input of the weight from weight sensing means in the scale and in response to other inputs to the electronic circuitry.

With the advent of the sophisticated and inexpensive electronic computational circuitry has developed a need for very inexpensive but highly accurate and sensitive electro-mechanical weight sensing means that can be fitted into the scale. The typical load cell, however, is expensive and cumbersome in comparison with the requirements of a simple, cheap but nevertheless computationally sophisticated and very accurate scale.

SUMMARY OF THE INVENTION

Applicant's scales disclosed in detail below utilize capacitative load cell sensing means configured to be insensitive to off center loading of the horizontal platform regardless of the load amount within the range of the scale or the location on the platform of the load. The platform is supported by a plurality of springs selected for equal spring rates and preferably located equidistant from and circumferentially about the platform. Although the preferred embodiments disclosed below utilize springs at the four corners of a rectangular platform, any number of springs about the platform from three to a continuous circumferential spring support may be utilized.

The capacitative load cell is connected electrically into a FET (Field Effect Transistor), CMOS (Complementary Metal Oxide Semiconductor) or Bi-Polar semiconductor multivibrator circuit selected and designed to sense electric currents on the order of $10^{-13}$ amperes. In one embodiment the load cell comprises a grounded hemispherical surface opposing a charged flat plate. In alternate embodiments the load cell comprises a differential capacitor or a parallel plate capacitor suspended in a manner that is insensitive to off center loading of the platform. The differential capcitor load cell embodiment utilizes an alternating switch circuit as a part of the multivibrator circuit.

In substitution for the multivibrator circuit a frequency modulated system clock circuit that is modulated by the load cell capacitance may be utilized as the weight sensing circuit and driver for the peripheral attachments to the scale circuit. Such attachments may suitabley include a key pad, ROM (Read Only Memory), RAM (Random Access Memory) and display or printer.

DESCRIPTION OF THE DRAWINGS

FIG. 2a is a detail of an alternate means of supporting the scale platform;

FIG. 8a is a detail for the additional electric circuitry for the alternate form of capacitor in FIG. 8;

FIG. 11 is a top view of a low profile capacitative weight scale;

FIG. 12 is a side cross sectional view of the low profile weight scale of FIG. 11; and FIG. 13 is a side cross sectional view of an alternate form of the low profile weight scale of FIG. 11.

DESCRIPTION OF THE PREFERRED EMBODIMENTS

Figure 1:
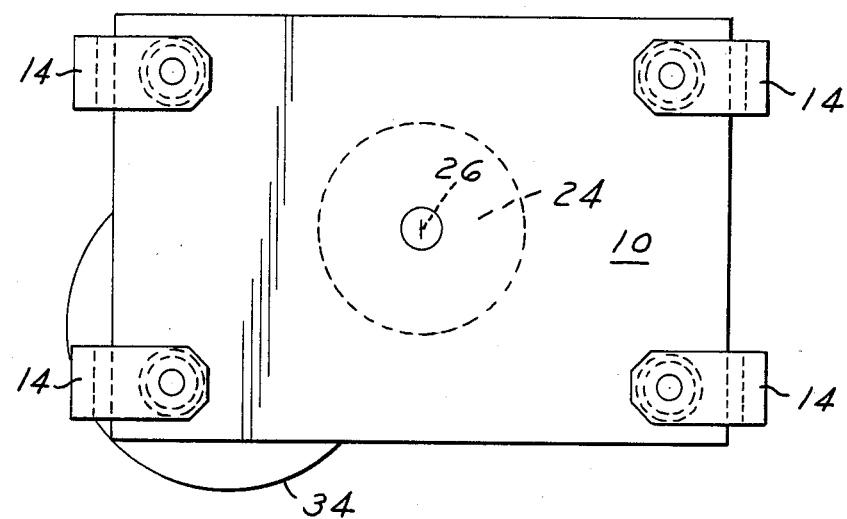
FIG. 1 is a top view of the capacitative weight scale.
Figure 2:
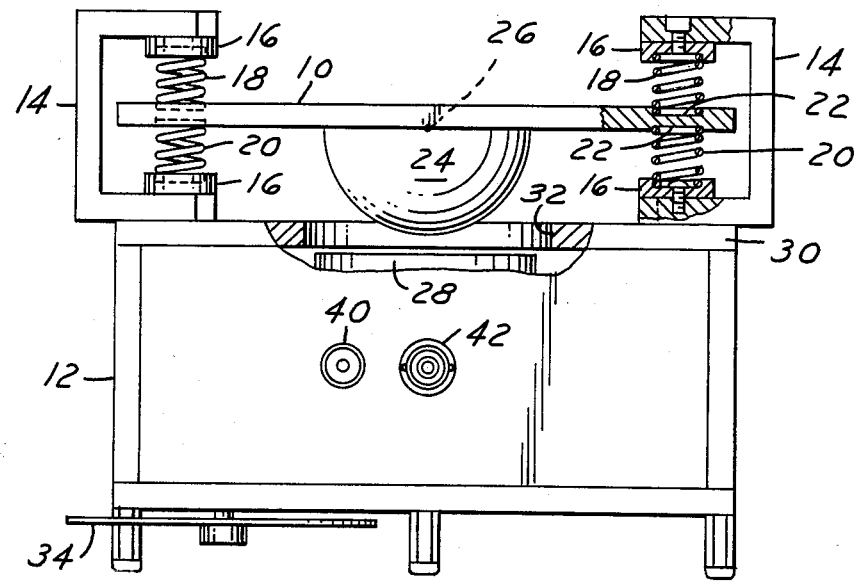
FIG. 2 is a partially cutaway side view of the weight scale.

Illustrated in FIGS. 1 and 2 is a weight scale employing a platform 10 suspended above a supporting box 12. The platform 10 is supported by four C-shaped brackets 14 at approximately the four corners of the platform 10. The brackets 14 are permanently affixed to the four upper corners of the box 12. Facing inwardly at each end of each bracket 14 are spring retainers 16. The coil spring retainers 16 each engage either upper 18 or lower 20 identical compression coil springs. The pairs of compression coil springs 18 and 20 at each corner of the platform 10 engage shallow sockets 22 formed in the upper and lower surfaces of the platform.

Attached to the underside of the platform 10 is a metal hemisphere 24. The hemisphere 24 is positioned at the center 26 of the platform 10 and each spring socket 22 is equidistant from the center 26. Located beneath the hemisphere 24 and supported within the box 12 is a metal flat plate 28 secured to an insulator that is driven by four lead screws. The box 12 top plate 30 is formed with a hole 32 above and somewhat larger than the flat plate 28. The metal hemisphere 24 extends into the hole 32 as shown to be in close proximity with the flat plate 28. For calibration purposes the flat plate 28 is moveable vertically by means of a lead screw or other conventional means to accurately raise and lower the flat plate. The calibration means include a rotatable dial indicator 34 extending from beneath the box 12. The dial indicator 34 is rotated to raise and lower the flat plate 28.

Figure 6:
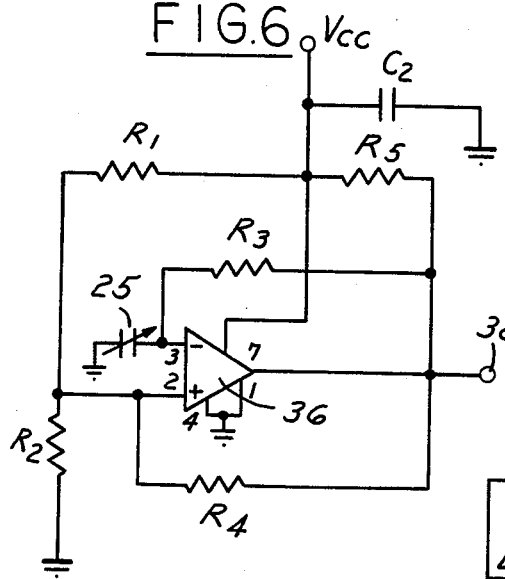
FIG. 6 is an electrical schematic of the internal circuitry for the weight scale.

In the embodiment of FIGS. 1 and 2 the metal hemisphere 24 and flat plate 28 comprise a variable capacitor denoted by 25 in FIG. 6. The variable capacitance typically ranges from 10 to 20 pico-farads for a hemisphere of about one inch radius spaced from 0.0005 inches to 0.1 inches from the flat plate. The balance of the electric weighing circuit shown in FIG. 6 comprises an LF 311 Field Effect Transistor Comparator 36 supplied by National Semiconductor Corporation or equivalent. The passive external electric elements are as follows:

R1 = 2 megohm

R2 = 2 megohm

R3 = 1 megohm

R4 = 3.9 megohm

R5 = 1,000 ohm

VCC = 5 volts

C2 = 0.1 micro farads

The circuit provides a free running multivibrator output at 38 which shifts in frequency (F$\phi$) in response to a changed capacitance 25.

Since the variable capacitance 25 is in the pico-farad range the circuit is located in a substantially air tight electrically shielded box or is potted in an electrically shielded box beneath the flat plate 28. The shielded box also aids in maintaining thermal stability. The flat plate 28 is electrically insulated from the shielded box 12 of FIGS. 1 and 2 and connected to pin 3 of the comparator 36 in FIG. 6. The hemisphere 24 is connected to electrical ground, thus, in the embodiment of FIGS. 1 and 2 the hemisphere 24, platform 10 and metal box 12 are all grounded together to provide an electrical shield about the internal weighing circuit within the box 12.

Figure 7:
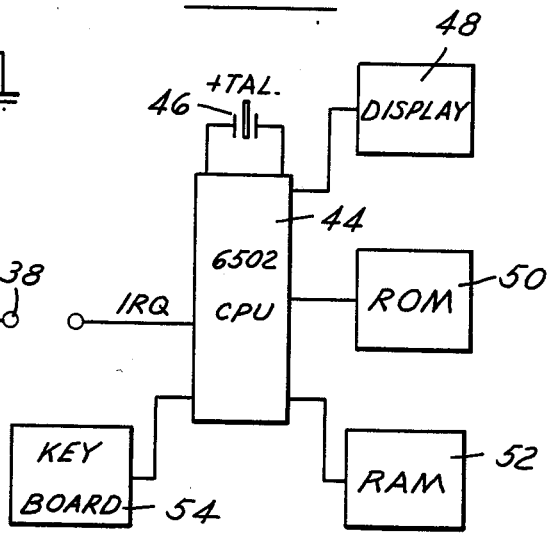
FIG. 7 is a block diagram of the external circuitry and peripheral attachments for the weight scale.

The exterior of the box 12 is provided wth a shielded socket 40 with which to connect a filtered 5 volt power supply to the weighing circuit and a shielded output socket 42 with which to connect the output 38 to a readout device or other attachment. As an example, in FIG. 7, the output 38 is connected (IRQ) to a 6502 Central Processing Unit (CPU) 44 available from several manufacturers and clocked by a crystal 46. The CPU in turn controls the display 48, read only memory (ROM) 50, random access memory (RAM) 52 and keyboard 54. The external circuit of FIG. 7 can be used to calculate various quantities based upon the output of the weighing circuit and information entered into the keyboard, e.g., calories per ounce for a piece of cake on the scale.

Figure 3:
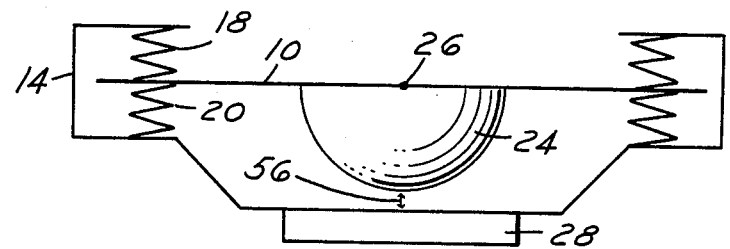
FIG. 3 is a schematic side view of the unloaded platform and capacitor.
Figure 4:
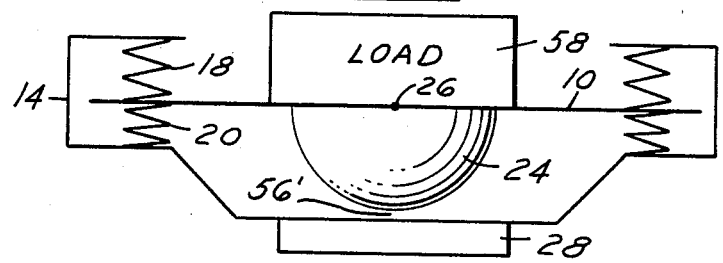
FIG. 4 is a schematic side view of the platform and capacitor with a center positioned load thereon.
Figure 5:
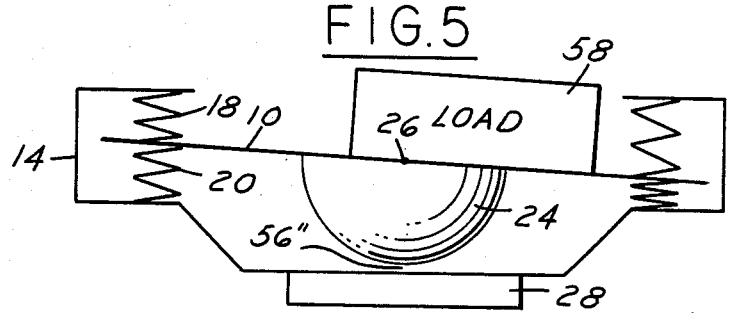
FIG. 5 is a schematic side view of the platform and capacitor with an off-center positioned load thereon.

Returning to FIGS. 1 and 2 and as shown in FIGS. 3, 4 and 5, the scale is insensitive to the locational placement of a load on the platform 10. In assembling the spring pairs 18 and 20 at each corner of the platform 10, the springs are preloaded to put all of the springs within their linear range for best accuracy. As shwon in FIG. 3 the hemisphere 24 is suspended a specific distance 56 above the flat plate 28. With a load 58 placed and centered at 26 as shown in FIG. 4, the platform 10 and hemisphere 24 move closer to the plate 28 as indicated by 56', compressed coil springs 20 and extended coil springs 18. The capacitance 25 changes to a new value, thus changing the output at 38 in FIG. 6.

In the event the same load 58 is not centered on the platform 10 as illustrated in FIG. 5, the platform 10 and hemishere 24 tilt as shown in exaggeration. Although the platform 10 has tilted, the tilt is about the center 26 which moves downwardly toward plate 28 the same distance with the same load 58 as in FIG. 4. Thus, the distance 56" of the hemisphere 24 from the plate 28 is dependent only upon the load and not upon the location of the load on the platform. Therefore, the capacitance at 25 and output at 38 are likewise only dependent on the load and not a function of the location of the load on the platform.

The embodiment of FIGS. 1 and 2 is constructed of a solid metal box 12, platform 10 and a metal hemisphere 24. However, several alternative constructions that utilize less expensive materials can be substituted without compromising the electrical shielding and grounded exterior of the scale. Any or all of the exterior parts and the variable capacitance 25 can be constructed of a suitable plastic that can be plated with metal such as nickel or chrome. Thus, the box 12, platform 10, hemisphere exterior 24 and plate 28 can all be very inexpensively constructed of metal plated plastic. The metal plated box 12 and platform 10 thus comprise a very inexpensive means of shielding the sensitive circuitry within the box. Temperature sensitivity is also greatly lessened by the shielded box and platform.

The C-shaped brackets 14 can also be constructed from plated plastic or, as shown in FIG. 2a, the brackets 14 can be eliminated by substituting preloaded tension coil springs 120 for the compression springs 18. The tension springs 120 are preferably located inside and concentric with the compression springs 118 as illustrated. Small holes through the platform 110, socket 116 and top plate 130 accommodate fastening hooks 117 for the tension springs 120.

Figure 8:
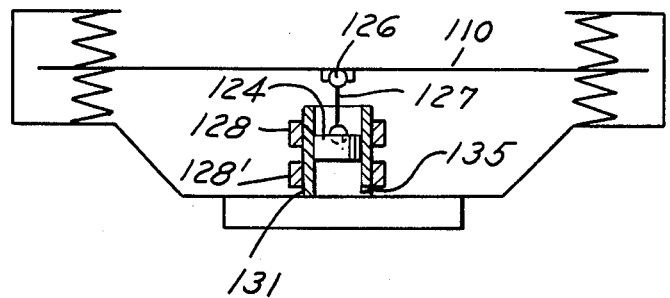
FIG. 8 is a schematic side view of an alternate form of the platform and capacitor.

Illustrated in FIGS. 8 and 8a is a differential capacitor embodiment of the load cell. At the center of the platform 110 is affixed a ball and socket joint 126. Suspended from the ball and socket 126 is a piston rod 127 and a conductive piston 124 suitably made from graphite. The piston 124 is movable vertically in a cylinder 131 of non-conductive and non-magnetic material, such as unplated plastic or Pyrex brand glass. The cylinder 131 is closed at the lower end and provided with an orifice 135 sized to provide fluid damping for the scale platform.

Surrounding the cylinder 131 is a pair of conductive rings 128 and 128' which are electrically connected to a semiconductor dual switch (CMOS) such as an RCA CA 4016. The switch center connection 129 is connected to the oscillator input (3) of the LF 311 comparator and the switches are alternately connected to the rings 128 and 128' by the CPU 44 through circuits 133 and 133'.

The result of the alternating switch connection is a multiplexed oscillator input that changes in frequency from a midfrequency when the piston 124 is equidistant from the rings 128 and 128'. If the piston 124 and rings 128 and 128' are of the same conductive material, then temperature expansion of the load cell will not affect the overall ratios of the oscillator frequency about the mid-frequency. Thus, temperature compensation is inherent in the differential capacitative load cell.

Figure 9:
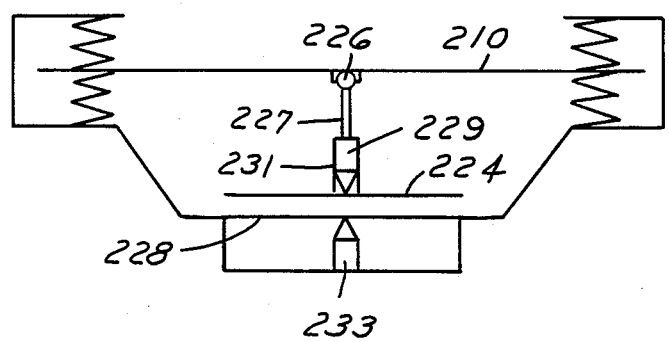
FIG. 9 is a schematic side view of a second alternate form of the platform and capacitor.

In FIG. 9 the ball and socket 226 mounted at the center of the platform 210 supports a connecting rod 227 fastened to a plastic tube 231. Adhesively fastened to the lower end of the tube 231 is a flat non-magnetic conductive plate 224 which is electrically connected to ground. Within the plastic tube 231 is a downwardly pointed magnet 229 with the north pole at the tip. Beneath the plate 224 is a non-magnetic conductive plate 228 forming the charged side of the capacitative load cell. Centered beneath the plate 228 is a second pointed magnet 233 with the south pole at the tip. The magnets cause the plate 224 to remain horizontal and parallel with plate 228 despite tilting or unbalanced loading of the platform 210. In the configuration of FIG. 9 the lower plate 228 is connected into the circuit of FIG. 6 in the same manner as the embodiment of FIGS. 1 through 5.

Figure 10:
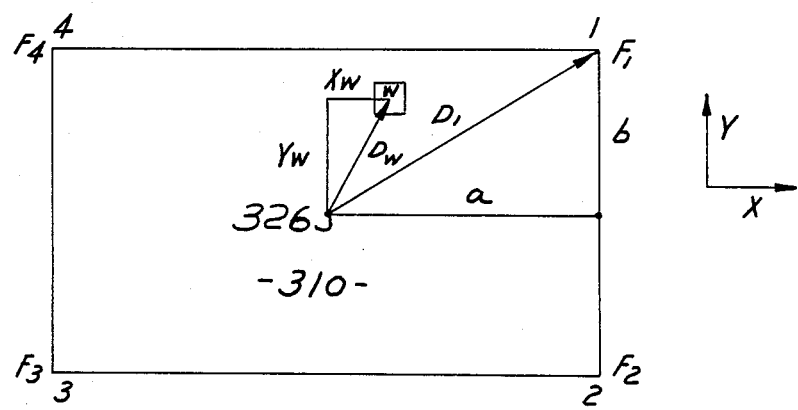
FIG. 10 is a geometric illustration used for the explanation of the mathematical basis of the scale.

FIG. 10 illustrates the geometry of the platform 310 upon which the mathematical analysis for the off center loading insensitivity is based. The sum of the four spring forces upwardly must equal the weight "W" or:

$$F_1 + F_2 + F_3 + F_4 - W = 0$$

The sum of the torques about any point on the platform must also equal zero, or:

$$T_1 + T_2 + T_3 + T_4 + T_w = 0$$

where $$T_1 = F_1 \times D_1, \; T_2 = F_2 \times D_2, \; T_3 = F_3 \times D_3,$$
$$T_4 = F_4 \times D_4 \text{ and } T_w = W \times D_w$$

And, "x" indicates a vector cross product.

Where the springs are matched the spring constant "S" for all the springs is substantially identical. By symmetry it can be shown that $F_1 + F_3 = F_2 + F_4$ and in turn that the deflection at the center 326 of the platform is a function of the spring rate S and the weight W and is not a function of the distance $D_w$ of the weight from the center of the platform. The analysis assumes that the forces $F_1$ through $F_4$ are always perpendicular to the platform. Owing to the small tilt of the platform in normal use, the assumption does not cause a significant error in measured weight.

Referring back to FIGS. 6 and 7 the LF 311 comparator may be eliminated by substituting a four bit microcomputer such as the NEC uPD 7503 or equivalent in place of the 6502 CPU. The system clock of the NEC uPD 7503 is timed by an external resistance and capacitance. Substitution of the variable weight sensing capacitance 25 for the clock creates a clock frequency that varies with the load in the scale platform. A second clock with the NEC uPD 7503 is formed by adding an external crystal to another micro-computer clock port to provide a constant frequency oscillator as a time reference in combination with the programmable counter of the computer.

The system clock with the variable frequency controls the time for a software routine to run a fixed number of instructions. At the end of the routine, the contents of the programmable counter above are read plus the number of times the counter overflowed. This number is a function of the capacitance 25 and therefore the load placed on the scale.

In a variation of the above technique, the number of times the programmable counter overflows is made constant and the number of instructions executed in that fixed time is counted. The number of instructions executed is thereby proportional to the system clock frequency and therefore a function of weight.

Illustrated in FIGS. 11 and 12 is a low profile capacitative weight scale employing the hemispherical variable capacitance. The scale includes a weighing table 408 rigidly affixed to a platform 410 therebelow by supports 409 passing through holes 407 in the top of the molded case or box 412 enclosing the workings of the scale. Within the case 412 and attached thereto by four vertically depending integral arms 411 are four brackets 414 located adjacent the four corners of the platform 410. Four lower coil springs 420 and four upper coil springs 418 suspend the platform 410 in the same manner as in the embodiment of FIGS. 1 and 2 above.

Affixed to the platform 410 and centered thereunder is a conductive hemisphere 424. Affixed to the bottom 413 of the case 412 is a conductive plate 428 below the hemishere 424. The plate 428 is mounted on three or more headed studs 415 that pass through holes in the plate 428 and are affixed to the bottom 413. Light spiral springs 417 on each stud 415 urge the plate 428 against the heads of the studs 415 as illustrated. In normal operation of the scale, the spiral springs 417 retain the plate 428 against the stud heads without movement. In the event the scale is overloaded well beyond its design limit and the hemisphere 424 is forced down into contact with the plate 428, the plate 428 can be depressed enough without damage to permit the weighing table 408 to rest on the case 412. To prevent inadvertant electrical contact because of the overload, a Mylar layer or other insulative film may be coated on the plate 428 or hemisphere 424 over the conductive surfaces. The film will maintain the system clock in the event of an overload and contact of the hemisphere with the plate.

Sloping down from the weighing table 408 and fastened into appertures in the case 412 are a liquid crystal display 448 and a key pad 454. Beneath the key pad 454 and display 448 is a printed circuit board 419 fastened to the case 412 with most of the discrete components (not shown) thereon suspended from the board 419 downwardly. The microprocessor 444 is located on the foil side of the board 419. The key pad 454 is directly connected into the foil side of the board 419 in a conventional manner.

Refering to the modifications illustrated in FIG. 13, the weighing table 408 is supported on a platform 410' therebelow by shorter supports 409' which pass through holes 407 in the top of the molded case or box 412. The platform 410 rests upon four compression coil springs 420' in turn supported on pedestals 414' extending from the bottom 413 of the case 412.

Affixed to the platform 410' and centered thereunder is a conductive hemisphere 424' that is somewhat larger in radius than the hemisphere of FIG. 12. Below the hemisphere 424' is a conductive flat plate 428'. The plate 428' is mounted rigidly on three or more headed studs 415' that pass through holes in the plate 428'.

To prevent contact of the hemisphere 424' with the plate 428', the gap between the weighing table 408 and the top of the case 412 indicated at 457 is less than the gap 456 between the hemisphere 424' and the plate 428'. Thus, when the weighing table 408 rests upon the case 412 because of an overload, the hemisphere 424' is prevented from striking the plate 428.

The modified scale of FIG. 13 is of simpler construction than that of FIG. 12, however, the platform requires small studs 417' or other means to limit upward travel of the platform under unloaded conditions. Either form of the scale, however, can be constructed of plastic that is plated with an electrically conductive material on the inside or outside of the case. Thus, the electronic workings of the scale are proteced from stray electric fields inadvertently applied to the scale and sudden outside temperature changes. In addition the conductive material also prevents radio frequency interference generated by the micro-computer from exceeding Federally mandated limits and causing Radio-TV interference.

We claim:

1. A platform scale comprising a supporting structure, a platform on the supporting structure for movement relative to the supporting structure in response to a weight placed on the platform,
   spring means supporting and connecting the platform to the supporting structure, said spring means permitting both linear and rotational movement of the platform relative to the supporting structure,
   a variable capacitor having the movable portion thereof affixed to the platform and the fixed portion of the capacitor mounted on the supporting structure, said capacitor configured to provide a change of capacitance upon linear movement of the platform relative to the supporting structure and substantially no change of capacitance with rotational movement of the platform,
   electrical means connected to the variable capacitor, said electrical means configured to sense a changed capacitance in the variable capacitor and in resonse thereto to provide an electrical output changed in response to the changed capacitance, and
   indication means connected to said electrical means and adapted to respond to the changed output with a changed display of information.

2. The platform scale of claim 1 wherein the variable capacitor comprises a portion of a substantially spherical surface affixed to the platform and having an electrically conductive surface and also comprises a flat electrically conductive surface mounted on the supporting structure adjacent the spherical surface, and
   wherein the center of the spherical surface is located substantially at the center of rotation of the platform.

3. The platform scale of claim 1 wherein the variable capacitor comprises a conductive piston, piston rod means rotatably affixed to the platform, a non-conductive cylinder containing said piston and mounted on the supporting structure, a plurality of conductive rings on the cylinder adjacent the conductive piston, and
   wherein the piston and cylinder are located substantially below the center of rotation of the platform.

4. The platform scale of claim 3 including a calibrated orifice communicating through the wall of the enclosed chamber formed by the piston and cylinder to provide fluid damping of the platform.

5. The platform scale of claim 3 wherein the electrical means includes a plurality of switches each connected to a ring and a microprocessor, said microprocessor including connections to actuate the switches cyclically in turn to sequentially connect each ring to the microprocessor oscillator input.

6. The platform scale of claim 1 wherein the variable capacitor comprises a non-magnetic electrically conductive flat plate, said flat plate rotatably affixed and suspended beneath the center of rotation of the platform, a magnet located above the flat plate and below the center of rotation of the platform, a second non-magnetic electrically conductive flat plate mounted on the supporting structure adjacent the first conductive flat plate and a second magnet located under the second conductive flat plate and below the center of rotation of the platform, and
   whereby the attraction of the magnets therebetween retains the first conductive flat plate centered beneath the center of rotation of the platform and parallel with the second conductive flat plate.

7. The platform scale of claim 1 wherein the electrical means comprises a multivibrator circuit changeable in frequency in reponse to the change in the variable capacitance.

8. The platform scale of claim 1 wherein the electrical means comprises a microprocessor having a system clock variable in frequency in response to changes in the variable capacitance, a reference constant frequency oscillator and programmable counter and a software routine in the microprocessor to accurately determine the capacitance as a function of a variable number of instructions executable in a fixed amount of time.

9. The platform scale of claim 1 wherein the spring means comprises a plurality of matched springs preloaded for matched linear deflection rates.

10. The platform scale of claim 1 wherein the spring means comprises a plurality of spring pairs, each pair comprising a compression spring and a tension spring acting in opposition thereto to preload both springs of the pair into the linear spring rate range.

11. The platform scale of claim 1 wherein the platform is supported on four matched springs equidistant from the center of the platform.

12. The platform scale of claim 1 wherein the electrical means comprises a microprocessor having a system clock variable in frequency in response to changes in the variable capacitance, a reference constant frequency oscillator and programmble counter and a software routine in the microprocessor to accurately determine the capacitance as a function of a variable amount of time to execute a fixed number of instructions.

13. A variable capacitor comprising a portion of a substantially sphericl electrically conductive surface, a substantially flat electrically conductive surface mounted adjacent the spherical electrically conductive surface, and means to move linearly with freedom of rotation only about the spherical center at least one of the electrically conductive surfaces relative to the other electrically conductive surface.

14. The variable capacitor of claim 13 wherein the means to move one electrically conductive surface relative to the other electrically conductive surface is constrained to relative movement in the direction of the spherical surface radius that is perpendicular to the flat electrically conductive surface.

15. The variable capacitor of claim 13 wherein at least one of the conductive surfaces comprises a conductive layer on a non-conductive substrate.

16. The variable capacitor of claim 13 wherein at least one of the conductive surfaces includes an insulative layer thereover facing the other electrically conductive surface.

17. A platform scale comprising an enclosing case and a weighing surface supported above a portion of the case, the case including electrically conductive means substantially surrounding the interior of the case,
   a platform beneath the weighing surface and supporting the weighing surface thereabove,
   spring means supporting and connecting the platform to the case, said spring means permitting both linear and rotational movement of the platform relative to the case,
   a variable capacitor having the moveable portion thereof affixed to the platform and the fixed portion of the capacitor mounted in the case, said capacitor configured to provide a change of capacitance upon linear movement of the platform relative to the supporting structure and substantially no change of capacitance with rotational movement of the platform, electrical means connected to the variable capacitor, said electrical means configured to sense a changed capacitance in the variable capacitor and in response thereto to provide an electrical output changed in response to the changed capacitance, and indication means connected to said electrical means and adapted to respond to the changed output with a changed display of information.

18. The platform scale of claim 17 wherein the variable capacitor comprises a portion of a substantially spherical surface affixed to the platform and having an electrically conductive surface and also comprises a flat electrically conductive surface mounted in the case.

19. The platform scale of claim 18 wherein the flat electrically conductive surface is flexibly mounted for movement upon contact of the electrically conductive spherical surface.

20. The platform scale of claim 19 including an insulative layer on at least one of the electrically conductive surfaces and facing the other electrically conductive surface.

21. The platform scale of claim 17 wherein the electrical means include a multivibrator circuit changeable in frequency in response to the change in the variable capacitance.

22. The platform scale of claim 17 wherein the electrical means comprises a microprocessor having a system clock variable in frequency in response to changes in the variable capacitance, a reference constant frequency oscillator and programmable counter and a software routine in the microprocessor to accurately determine the capacitance as a function of a variable number of instructions executable in a fixed amount of time.

23. The platform scale of claim 17 wherein the spring means comprises a plurality of matched springs preloaded for matched linear deflection rates.

24. The platform scale of claim 17 wherein the platform is supported on four matched springs equidistant from the center of the platform.

25. The platform scale of claim 17 wherein the electrical means comprises a microprocessor having a system clock variable in frequency in response to changes in the variable capacitance, a reference constant frequency oscillator and programmable counter and a software routine in the microprocessor to accurately determine the capacitance as a function of a variable amount of time to execute a fixed number of instructions.

26. A variable capacitor having one portion thereof affixed to means with a center, said means capable of linear movement of the center relative to the other portion of the capacitor and rotational movement about the center relative to the other portion of the capacitor, and said capacitor configured to provide a change of capacitance upon relative linear movement of the center toward the other portion of the capacitor but no substantial change of capacitance with relative rotational movement of the means about the center.

* * * * *